United States Patent

[11] 3,590,715

| [72] | Inventor | Artur Schops<br>Munich, Germany |
|---|---|---|
| [21] | Appl. No. | 861,828 |
| [22] | Filed | Sept. 29, 1969 |
| [45] | Patented | July 6, 1971 |
| [73] | Assignee | Steinheil-Lear Siegler AG<br>Munich, Germany |
| [32] | Priority | Sept. 28, 1968 |
| [33] | | Germany |
| [31] | | P 17 97 448.0 |

[54] ADAPTER AND OBJECTIVE FOR USE IN PHOTOGRAPHIC APPARATUS
13 Claims, 9 Drawing Figs.

[52] U.S. Cl. ................................................. 95/44 R,
95/64 A, 95/64 B
[51] Int. Cl. ........................................................ G03b 3/00
[50] Field of Search ............................................. 95/44, 64,
64 A, 64 B

[56] References Cited
UNITED STATES PATENTS
3,470,809 10/1969 Uchida ........................ 95/64

3,489,071 1/1970 Mohr et al. .................. 95/64 B
3,500,735 3/1970 Mito .............................. 95/44

*Primary Examiner*—Samuel S. Matthews
*Assistant Examiner*—E. M. Bero
*Attorney*—Michael S. Striker ABSTRACT: An objective wherein the diaphragm can be preset by a lever mounted on its barrel and can be cocked by a diaphragm cocking device in a camera with an exposure control. The objective can be coupled to several types of cameras by means of adapters provided with at least one cam serving to transmit motion to the lever in such a way that the lever moves in a single direction irrespective of the direction of movement of the cam. The cam can be moved by a manually operated ring which is turnable on the adapter with reference to a fixed diaphragm scale. The cam compensates for eventual differences between such angular movements of the ring which are needed to move the ring between successive positions indicating different f/stops and corresponding angular movements of the lever in order to change the aperture size by full f/stops. According to the particular type of the camera and its exposure control, the ring is turnable in clockwise or in counterclockwise. A pin or the like on the ring is in engagement with the exposure control.

INVENTOR.
ARTUR SCHÖPS

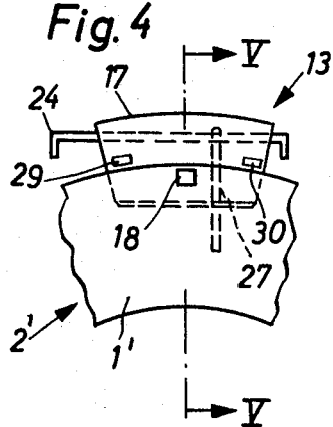
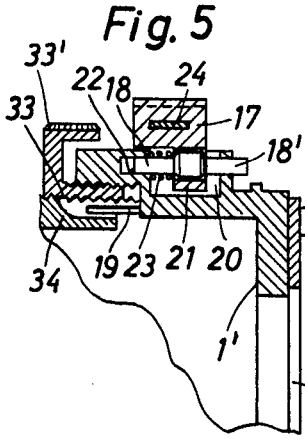
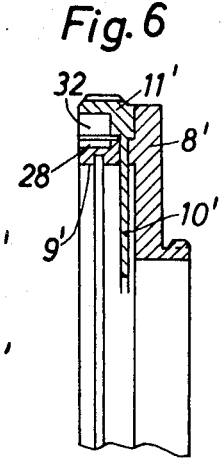
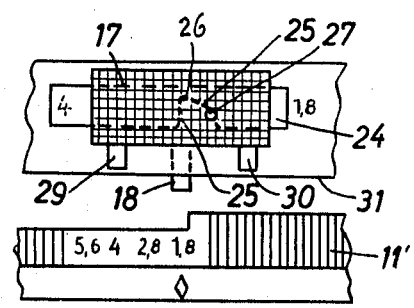
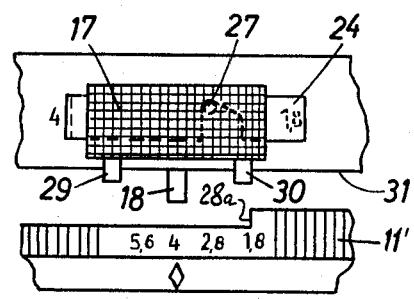
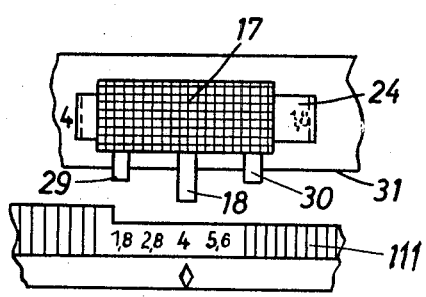

ADAPTER AND OBJECTIVE FOR USE IN PHOTOGRAPHIC APPARATUS

BACKGROUND OF THE INVENTION

The present invention relates to photographic apparatus in general, and more particularly to improvements in photographic apparatus of the type wherein the barrel of the objective or a holder for the barrel is connectable to the body of the apparatus by means of an adapter which is provided with manually operated means for presetting the diaphragm and which permits coupling of the diaphragm in the barrel with the automatic exposure control in the body.

It is well known to install in a photographic apparatus (e.g., in a still camera) an automatic exposure control and to furnish the camera with several removable or interchangeable objectives. Such objectives must be provided with devices which couple them to the camera body as well as with devices which insure proper connection between the diaphragm (in the objective) and the exposure control in the camera body. Adapters are used to connect the camera body with two or more different objectives. As a rule, a conventional adapter comprises a threaded portion for connection to the camera body and a bayonet lock for connection with the barrel of the objective lens or with a holder for the barrel of an invertible (two-way) objective. It is also known to provide an adapter with a manually operated selector or presetting means for the aperture size as well as to provide the objective and the photographic apparatus with devices which establish an appropriate motion transmitting connection between the exposure control in the body of the apparatus and the diaphragm in the barrel for the objective lens. However, each camera manufacturer furnishes a different type of motion transmitting connection so that, as a rule, each objective is connectable only to a single type of camera body, i.e., the diaphragm in the objective can be coupled only to a particular type of exposure control. Such lack of standardization contributes to the cost of photographic equipment because the owner of two or more cameras must purchase several sets of interchangeable objectives. The lack of standardization is attributed mainly to the fact that the output members of the exposure controls in different types of cameras must be rotated through different angles in order to change the aperture size by one stop.

SUMMARY OF THE INVENTION

An object of the invention is to provide a photographic apparatus, particularly a still camera, with a novel combination of adapter and objective which is designed in such a way that the diaphragm in the objective can be properly coupled with several types of exposure controls merely by changing the adapter so that the more expensive component of the combination (i.e., the objective) can be used with two or more cameras even if such cameras embody widely different automatic or semiautomatic exposure controls.

Another object of the invention is to provide novel nd improved adapters which can connect a particular objective with the bodies of two or more camera types and which can be used in connection with objectives having a barrel which is directly connectable to the adapter or a barrel which must be connected with the adapter through the intermediary of a holder.

The invention resides in the provision of a structure which is intended for use with photographic apparatus of the type including a body accommodating an exposure control having a diaphragm adjusting output member. The structure comprises an objective having a barrel, an adjustable diaphragm installed in the barrel and adjusting means mounted on the barrel and movable in a given direction between a first series of positions to thereby preselect a sequence of aperture sizes, and a preferably ring-shaped adapter including first and second connecting means for respectively coupling the adapter to the camera body and to the objective (either directly to the barrel or to a holder for the barrel).

In accordance with a feature of the invention, the adapter further includes actuating means arranged to move in one of several directions between a second series of positions to thereby effect movement of the adjusting means between the first series of positions in the given direction.

An advantage of the just described structure is that the adjusting means (e.g., a lever which is pivotably mounted on the barrel of the objective) can be installed to move between a first series of positions which may be closer together or more distant from each other than the corresponding positions of the actuating means on the adapter, as well as that the direction of movement of the actuating means may but need not be the same as the direction of movement of the adjusting means. The actuating means may comprise a ring which is rotatable on the adapter and carries at least one cam which can pivot the aforementioned lever by way of a follower on the lever while the ring is rotated by hand in a clockwise direction or in a counterclockwise direction, depending upon the particular exposure control in a camera connected with the adapter whereby the ring is coupled with the exposure control. If desired, the cam on the ring of the adapter may be a groove cam and the follower of the diaphragm adjusting lever then extends into the groove of the cam. Alternatively, the lever may be biased by a spring which tends to maintain the follower in engagement with the face of the cam.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a fragmentary rear elevational view of the objective, further showing a coupling device which serves to connect the barrel of the objective to the adapter in a predetermined angular position;

FIG. 5 is a sectional view as seen in the direction of arrows from the line V-V of FIG. 4;

FIG. 6 is an axial sectional view of the adapter for the objective of FIGS. 4 and 5;

FIG. 7 is a fragmentary exploded view of the parts shown in FIGS. 5 and 6, the coupling device being shown in a first position;

FIG. 8 illustrates the structure of FIG. 7 but with the coupling device in a different position; and FIG. 9 is a fragmentary exploded view of the objective of FIG. 5 and a modified adapter.

DESCRIPTION OF THE PREFERRED EMBODIMENTS

Figure 1:
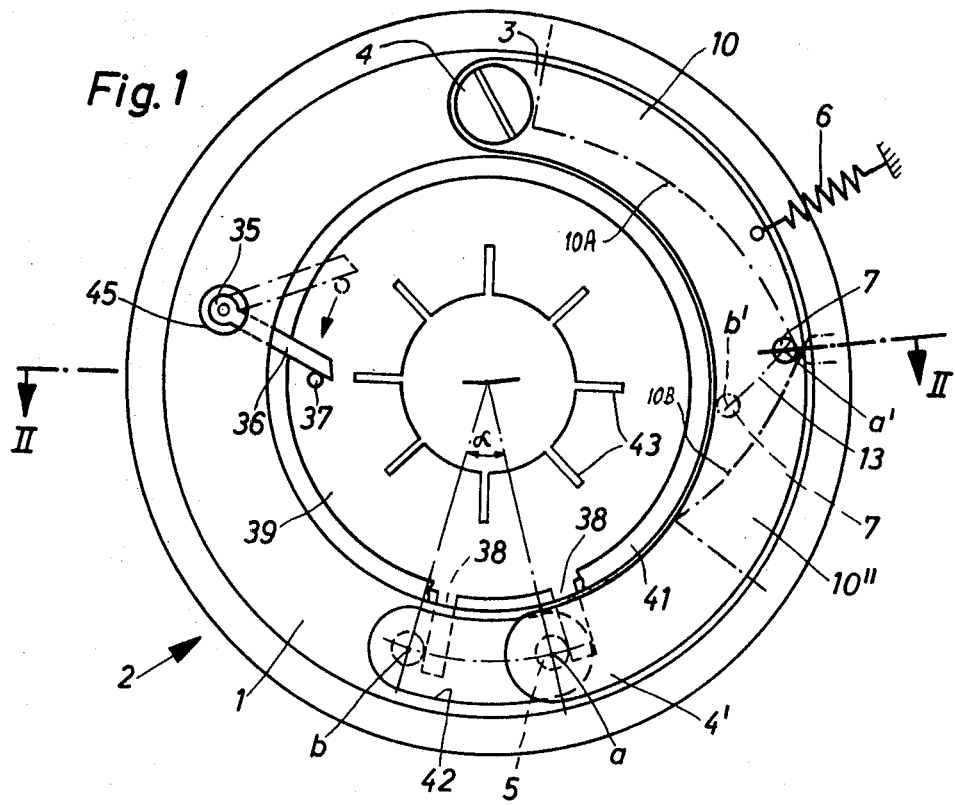
FIG. 1 is a rear end elevational view of an objective which can be used with the improved adapter.

FIG. 1 illustrates a removable objective 2 which can be coupled to the body of a camera. That end wall (1) of the barrel of the objective 2 which faces the housing of the camera when the objective is properly coupled to such camera body carries an arcuate adjusting lever 3 which is turnable on a pivot pin 4 extending in parallelism with the optical axis. The free end portion 4' of the adjusting lever 3 carries a selector post or pin 5 which can preset the diaphragm in the objective 2 so that the diaphragm defines an aperture or desired size when the aperture size is to be selected by hand with a ring on the adapter. The ring 11 is in connection with the exposure control of the camera and hence the aperture size may be selected as a function of scene brightness. The post 5 extends into the barrel of the objective 2 and is parallel to its optical axis.

Figure 2:
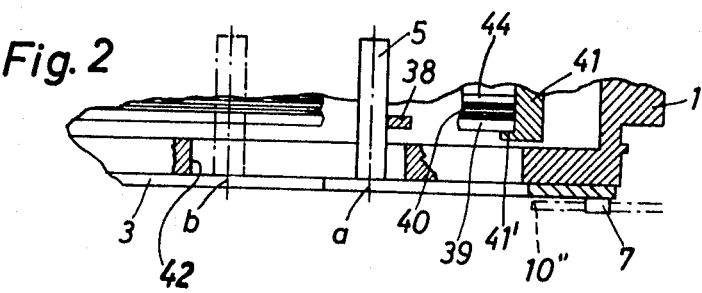
FIG. 2 is a fragmentary axial sectional view of the objective as seen in the direction of arrows from the line II-II of FIG. 1.

The diaphragm in the barrel of the objective 2 comprises a ring-shaped setting member 39 having a radially outwardly extending projection or tongue 38 which can be engaged and arrested by the post 5. The setting member 39 can be turned in a counterclockwise direction, as viewed in FIG. 1, between an uncocked and a cocked position in which latter position the blades 40 of the diaphragm define an aperture of maximum size. A spring (not shown) permanently biases the setting member 39 to its uncocked position in which the blades 40 of the diaphragm define an aperture of zero size. The setting member 39 is turnable in a sleeve 41 of the objective barrel; this sleeve has a ring-shaped flange 41' which is shown in FIG. 2 and serves to hold the setting member 39 against axial movement. The latter is formed with radially extending slots 43 for pins (not shown) provided on the blades 40. These blades are further connected with a stationary supporting member or plate 44 which is mounted in the sleeve 41. The just described diaphragm is similar to the diaphragm disclosed in my copending application Ser. No. 860,682 entitled "Photographic Apparatus with Two-Way Objective," which is assigned to the same assignee.

Figure 3:
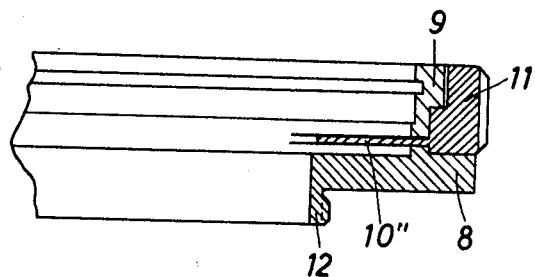
FIG. 3 is a fragmentary axial sectional view of an adapter which can be used with the objective of FIG. 1.

The selector lever 3 can be pivoted about the axis of the pin 4 by a manually rotatable actuating ring 11 which is mounted on a ring-shaped adapter 8 shown in FIG. 3. The extent to which the lever 3 can be pivoted to move the post 5 between the positions a and b shown in FIGS. 1 and 2 is indicated by the angle alpha. A spring 6, operating between the lever 3 and the barrel of the objective 2, tends to maintain the post 5 in the position a. The lever 3 is further provided with a fixedly mounted projection or follower 7. The end wall 1 of the objective barrel has an elongated arcuate slot 42 through which the post 5 extends into the interior of the barrel and into the path of movement of the tongue 38.

As shown in FIG. 3, the adapter 8 comprises a ring-shaped coupling element 9 which enables the user of the camera to connect the barrel of the objective 2 with the adapter in bayonet lock fashion. When the objective 2 is properly coupled to the adapter 8, the follower 7 of the lever 3 engages the face of a cam 10' or 10" in the adapter. FIG. 2 indicates the position of the cam 10' by broken lines. FIG. 1 shows two cams (10' and 10") but solely to facilitate the understanding of my invention because the adapter 8 may be provided with a single cam, i.e., with the cam 10' or 10" or with an otherwise configurated cam. The cam (e.g., the cam 10" of FIGS. 2 and 3) is connected to and is rotatable with the actuating ring 11 on the adapter 8. When the actuating ring 11 is located in an end position and the objective 2 is properly coupled to the adapter 8, the follower 7 of the lever 3 engages one end of the face on the cam 10". FIG. 3 further shows a threaded nipple 12 which can be screwed into the body of a camera.

The adapter 8 is selected in dependency on the characteristics of the camera which is to be used with the objective 2. If the camera is of the type wherein the actuating ring (11) should preferably be rotated in a clockwise direction to change the aperture size from a minimum to a maximum value, or vice versa, the adapter 8 will be provided with the cam 10'. If the actuating ring 11 is to be rotated in a counter clockwise direction, the adapter will embody the cam 10". If the design of the camera renders it necessary or desirable to employ an adapter with a cam 10' having a concave face 10A shown in FIG. 1, the follower 7 will travel along an arcuate path 13 in response to clockwise rotation of the ring 11 and cam 10' from the starting position shown FIG. 1. The center of the follower 7 is then moved from the position a' to the position b' and the post 5 is moved from the position a to the position b. The positions a and b respectively correspond to maximum and minimum aperture sizes. The selected aperture size is of minimum size when the ring 11 and cam 10' are rotated in a clockwise direction to move the post 5 to the position b and when the setting member 39 is thereupon released to move its tongue 38 into engagement with the post 5. The spring 6 insures that the follower 7 always tracks the cam face 10A.

If the objective 2 is connected with an adapter 8 which embodies the cam 10", the ring 11 must be rotated in a counterclockwise direction (as viewed in FIG. 1) in order to move the post 5 from the position a to the position b. The cam 10" has a face 10B which is tracked by the follower 7 and causes the post 5 to move from the position a to the position b in response to a counterclockwise rotation of the ring 11 and cam 10". The follower 7 then again moves along the path 13 (between the positions a' and b'). The configuration of the cam face 10A or 10B depends on the type of the camera i.e., on the extent to which the ring 11 must be rotated from starting position in order to select a predetermined aperture size. Otherwise stated, the configuration of the cam face 10A or 10B depends on the difference between the angle through which the ring 11 is rotated and the angle through which the lever 3 must be pivoted in order to select a desired aperture size.

For example, if the angle through which the ring 11 is rotated in order to select successive f/stops equals 7° and the lever 3 must be pivoted through 4°, the cam face 10A or 10 B must be configurated in such a way that each angular displacement of the ring 11 through 7° effects an angular movement of the lever 3 through only 4°. The curvature of the face 10A or 10B is less (i.e., its length is greater) if the difference between the angular movements of the ring 11 and lever 3 is greater, and vice versa. As a rule, it is desirable and advantageous to design the diaphragm in such a way that a change from f/stop to f/stop necessitates a small pivotal movement of the lever 3. This presents no problems since the face 10A or 10B of the cam 10' or 10" can be readily designed in such a way that even a very large angular displacement of the ring 11 brings about such small pivotal movement of the lever 3.

The casing of the adapter 8 and the ring 11 can be of standard size. Thus, the manufacturer merely produces various types of cams which can be installed in standard casings to constitute therewith adapters for use with several types of cameras.

The body of the camera which is to be used with the objective 2 and adapter 8 comprises an exposure control adapted to be coupled to a shaft 35 having a radial arm 36. The shaft 35 is rotatably mounted in the barrel of the objective 2 and extends outwardly therefrom through an opening 45 provided in the end wall 1 of the barrel. The exact manner in which the outwardly extending portion of the shaft 35 can be coupled to the output member 145 in the camera body forms no part of the present invention. It suffices to say that, when the adapter 8 and the objective 2 are properly coupled to the camera body, the exposure control is in connection (not shown) with the ring 11 on the adapter 8 and the shaft 35 is in connection with a diaphragm cocking device in the camera over the output member 145. The diaphragm cocking device can move the arm 36 from the broken line position to the solid-line position of FIG. 1 to thereby move the setting member 39 counterclockwise from uncocked to cocked position against the opposition of the aforementioned spring (not shown). Thus, when the arm 36 assumes the solid-line position of FIG. 1, the blades 40 of the diaphragm define an aperture of maximum size. During cocking of the setting member 39 by the arm 36 of the shaft 35, from the minimum to the maximum aperture size, the post 5 on the lever 3 must be held in the position b so that it does not interfere with movement of the tongue 38 on the setting member.

The aperture size is to be selected by hand, the shaft 35 and its arm 36 may be used solely to move the setting member 39 to cocked position. Prior to making an exposure, the user of the camera causes the shaft 35 to cock the setting member 39 and the user thereupon rotates the actuating ring 11 to move the post 5 to a desired position (between the positions a and b whereby the post 5 extends into the path of movement of the tongue 38 on the cocked setting member. The manner in which the exposure is made is described in the aforementioned copending application. The exposure is made at a time when the diaphragm blades 40 define an aperture of preselected size, namely, a size which is determined by the position of the post 5 between its end positions a and b.

The output member 145 shown in FIG. 1 by broken lines forms part of the adapter or the camera, coupling the diaphragm cocking device in the camera to the outer end portion of the shaft 35 when the adapter 8 is properly attached to the camera body and when the objective 2 is properly coupled to the adapter.

The manner in which the objective 2' can be coupled with the adapter 8' in accurately determined position is illustrated in FIGS. 4 to 9. The coupling device between the objective 2' and the adapter 8' is denoted by the numeral 13; this device serves the additional purpose of determining various initial positions of the actuating ring 11' on the adapter 8'. This is desirable or necessary if the objective 2' is of the type disclosed in my aforementioned copending application wherein an invertible two-way lens mount is coupled with a ring-shaped holder provided with a threaded connector enabling the holder to accept lens mounts having lenses of different power.

The coupling device 13 comprises a casing 17 which is secured to the barrel of the objective 2 by an axially parallel locating projection or stud 18. The barrel has a cutout 20 which accommodates an extension 21 of the casing 17 and communicates with an axially parallel hole 22 of the barrel. The stud 18 is reciprocable in the hole 22. A helical spring 23 reacts against a wall of the barrel and bears against the extension 21 to bias the casing 17 in a direction toward the camera body. The locating stud 18 shares such movements of the extension 21.

The casing 17 carries a slide 24 which crosses in space the stud 18 and has a recess or notch 25 bounded in part by an inclined guide face 26. The notch 25 accommodates a displacing pin 27 of the barrel. This pin 27 cooperates with the guide face 26 to maintain the casing 17 in one of several axial positions with reference to the barrel. If the slide 24 is shifted in a direction to the left, as viewed in FIG. 7, the casing 17 is moved to a retracted position (nearer to the camera body). The end portion 18' of the locating stud 18 then extends into a cutout 28 of the adapter 8' provided that the adapter is properly positioned with reference to the objective 2'.

The casing 17 further carries two axially parallel locating projections or pins 29 and 30 which do not extend beyond the rear end face 31 of the barrel. When the casing 17 assumes the retracted position of FIG. 7. If the slide 24 is shifted in a direction to the right to assume the position shown in FIG. 8, the casing 17 is moved rearwardly (toward the rear end face 31 of the barrel) so that the locating pins 29, 30 extend beyond the end face 31 and into an annular groove 32 of the actuating ring 11'. The depth of the aforementioned cutout 28 equals or approximates the depth of the groove 32 and suffices to insure that the end portion 18' is accommodated in the cutout 28 when the pins 29, 30 extend into the groove 32. The end portion 18' also extends into the groove 32 to insure proper positioning of the adapter 8' with reference to the barrel as well as to hold the actuating ring 11' in that initial position which corresponds to the smallest aperture size (e.g., an f/stop of 1.8) (shown in FIG. 7). In the position of the slide 24 as shown in FIG. 8, in which the pins 29, 30 also extend into the groove 32, the ring 11' can select only an f/stop of 4 or a larger f/stop because the pin 30 engages the surface 28a in the ring 11 so that such surface cannot reach the end portion 18'. The pin 29 is active if the ring 11 is replaced with the ring 111 of FIG. 9 in which the position of the diaphragm aperture scale is reversed with reference to the position of the scale shown in FIG. 8.

It is clear that the coupling device 13 can be readily modified so that it can arrest the ring 11' or 111 in more than two positions. The casing 17 can be fixedly mounted on the barrel. If the user wishes to detach the casing 17 from the barrel, the extension 21 is pushed forwardly (away from the adapter 8) by hand so that the end portion 18' of the stud 18 is withdrawn from the recess 28. The adapter 8 is thereupon separable from the barrel.

FIG. 5 further shows a mechanism for shifting the lens in the objective 2 in the axial direction of the barrel. This mechanism comprises a manually rotatable focusing ring 33' having threads 33 which mesh with external threads of a ring-shaped lens mount 34. The ring has a second set of threads which mate with internal threads of the barrel. A guide rod 19 of the barrel extends into the lens mount 34 and holds the latter against rotary movement with the ring 33'. If the threads 33 are left-hand threads, the other threads of the ring 33 are right-hand threads, or vice versa. I will be readily understood that the guide rod 19 compels the lens mount 34 to move axially in response to rotation of the focusing ring 33'. The structure of FIGS. 4 to 9 is necessary when the objective 2 is of the type which can accommodate different types of lens mounts each having an objective lens of different power and if the adapter has a single diaphragm scale.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What I claim as new and desired to be protected by Letters Patent is set forth in the appended

1. For use with photographic apparatus of the type having a body accommodating an exposure control including diaphragm adjusting output means, a combination comprising an objective having a barrel, an adjustable diaphragm in said barrel, and adjusting means mounted on said barrel and movable in a given direction between a first series of positions to thereby select a succession of aperture sizes; and ad adapter including first and second connecting means for respectively coupling the adapter to the body of the apparatus and to said objective, said adapter further including actuating means arranged to move in one of several directions between a second series of positions to thereby effect movement of said adjusting means between said first series of positions in said given direction.

2. A combination as defined in claim 1, wherein said adjusting means comprises follower means and said actuating means comprises a manually rotatable ring and cam means cooperating with said follower means and movable by said ring to move said adjusting means between said first series of positions in response to rotation of said ring between said second series of positions.

3. A combination as defined in claim 2, wherein said adjusting means further comprises a lever mounted on said barrel and pivotable about a predetermined axis between said first series of positions, said follower means being provided on said lever.

4. A combination as defined in claim 3, wherein the extent of angular movements of said lever between said first series of positions is different from the extent of angular movements of said ring between said second series of positions.

5. A combination as defined in claim 2, wherein said cam means and said ring are located in mutually inclined planes.

6. A combination as defined in claim 1, wherein said barrel includes an end wall and said adjusting means comprises a lever pivotally mounted on said end wall and having follower means and a selector member extending into said barrel, said actuating means comprising a cam movably mounted on said adapter and cooperating with said follower means to move said lever and said selector member between said first series of positions in response to manual displacement of said cam between said second series of positions.

7. A combination as defined in claim 6, wherein said follower is in permanent engagement with said cam.

8. A combination as defined in claim 6, further comprising means for biasing said follower means against said cam.

9. A combination as defined in claim 1, further comprising a coupling device having locating means for locating said actuating means in a predetermined initial position with reference to said adapter as a function of the power of the lens in said objective.

10. A combination as defined in claim 9, wherein said coupling device comprises at least one spring-biased projection arranged to engage said actuating means in response to connection of said objective to said adapter.

11. A combination as defined in claim 9, wherein said objective comprises an interchangeable lens.

12. A combination as defined in claim 11, wherein said locating means comprises a plurality of locating projections and means for moving at least one of said projections into engagement with said actuating means.

13. A combination as defined in claim 9, wherein said locating means includes means for maintaining said objective in a predetermined angular position with reference to said adapter.